United States Patent
Hawk et al.

(10) Patent No.: US 11,928,660 B2
(45) Date of Patent: Mar. 12, 2024

(54) SCANNER SWIPE GUIDANCE SYSTEM

(71) Applicant: Toshiba Global Commerce Solutions Holdings Corporation, Tokyo (JP)

(72) Inventors: James I. Hawk, Morrisville, NC (US); Patricia S. Hogan, Raleigh, NC (US); Suzanne M. Griep, Apex, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 20 days.

(21) Appl. No.: 17/698,060

(22) Filed: Mar. 18, 2022

(65) Prior Publication Data
US 2023/0297985 A1    Sep. 21, 2023

(51) Int. Cl.
*G06Q 20/20*    (2012.01)
*G06Q 20/18*    (2012.01)

(52) U.S. Cl.
CPC .......... *G06Q 20/18* (2013.01); *G06Q 20/208* (2013.01)

(58) Field of Classification Search
CPC .... G06Q 20/208; G06Q 20/18; G06K 7/1413; G06K 7/1096; G06K 7/1491; G07G 1/0045; G07G 1/0054
See application file for complete search history.

(56) References Cited

U.S. PATENT DOCUMENTS

| | | | | | |
|---|---|---|---|---|---|
| 5,256,864 A | * | 10/1993 | Rando | ................ | G06K 7/10693 235/462.14 |
| 5,444,226 A | * | 8/1995 | Collins, Jr. | ........ | G06K 7/10851 235/383 |
| 5,525,788 A | * | 6/1996 | Bridgelall | .......... | G06K 7/10653 235/462.14 |
| 5,773,807 A | * | 6/1998 | Barkan | .............. | G06K 7/10851 235/472.01 |
| 5,825,010 A | * | 10/1998 | Charych | ............ | G06K 7/10792 235/472.01 |
| 6,056,087 A | * | 5/2000 | Addy | ................... | G07G 1/0045 235/383 |
| 6,408,407 B1 | * | 6/2002 | Sadler | ................. | G06F 11/0736 714/48 |
| 10,007,824 B1 | * | 6/2018 | McQueen | ........ | G06K 19/06112 |
| 10,089,614 B1 | * | 10/2018 | Catoe | ................... | G06Q 20/208 |
| 10,169,752 B2 | * | 1/2019 | Katsumura | .......... | G06V 10/764 |

(Continued)

FOREIGN PATENT DOCUMENTS

| | | | | |
|---|---|---|---|---|
| CN | 112185030 A | * | 1/2021 | |
| DE | 19518888 C2 | * | 5/1999 | ............. A47F 9/047 |
| WO | WO-2021176840 A1 | * | 9/2021 | ........... G06Q 20/208 |

OTHER PUBLICATIONS

E. C. Broockman. "Performance-Sensitive Gain-Adjustment Routine for Checkout Scanner", IBM Technical Disclosure Bulletin, vol. 24, #9, Feb. 1982, pp. 4844-4846. (Year: 1982).*

(Continued)

*Primary Examiner* — Ashford S Hayles
(74) *Attorney, Agent, or Firm* — Patterson + Sheridan, LLP (57) ABSTRACT

Techniques for generating a window of effectiveness are provided. A region of effectiveness for a scanner at a checkout kiosk is provided, wherein the region of effectiveness defines a volume where successful scans occur. It is determined that a first path of an item is outside the region of effectiveness. Feedback to change a path of the item to be within the region of effectiveness during a rescan of the item is outputted, using the checkout kiosk.

17 Claims, 5 Drawing Sheets

(56) References Cited

U.S. PATENT DOCUMENTS

| | | | | |
|---|---|---|---|---|
| 10,817,691 | B1* | 10/2020 | Wilfred | G06T 7/13 |
| 10,958,807 | B1* | 3/2021 | Holub | G06K 7/1443 |
| 11,138,584 | B1* | 10/2021 | Catoe | G06Q 20/208 |
| 11,314,959 | B1* | 4/2022 | Alessandrini | G06K 7/1456 |
| 11,481,751 | B1* | 10/2022 | Chaubard | G06V 10/82 |
| 11,482,082 | B2* | 10/2022 | Farrow | G06Q 20/4016 |
| 11,727,229 | B1* | 8/2023 | Lupo | G06V 30/19173 235/462.14 |
| 2002/0047047 | A1* | 4/2002 | Poloniewicz | G06K 7/10722 235/454 |
| 2002/0074402 | A1* | 6/2002 | Latimer | G06K 7/10861 235/454 |
| 2002/0123932 | A1* | 9/2002 | Brenhouse | G06Q 20/204 705/16 |
| 2004/0118928 | A1* | 6/2004 | Patel | G06K 7/0004 235/472.01 |
| 2004/0182650 | A1* | 9/2004 | Harris | A47F 9/047 186/66 |
| 2005/0092834 | A1* | 5/2005 | Latimer | G06K 7/10861 235/383 |
| 2006/0043185 | A1* | 3/2006 | Joseph | G06K 7/10722 235/455 |
| 2007/0051800 | A1* | 3/2007 | Muto | G07G 1/0054 235/383 |
| 2007/0205277 | A1* | 9/2007 | Tashiro | G07G 1/0036 235/383 |
| 2008/0164309 | A1* | 7/2008 | Latimer | G06Q 10/06398 235/383 |
| 2009/0084855 | A1* | 4/2009 | Herwig | G06K 7/10722 235/462.41 |
| 2009/0182638 | A1* | 7/2009 | Taylor | G07G 1/0045 705/17 |
| 2010/0282850 | A1* | 11/2010 | Olmstead | G06K 7/10722 235/440 |
| 2011/0127333 | A1* | 6/2011 | Veksland | G06K 7/1096 235/462.24 |
| 2011/0198400 | A1* | 8/2011 | Sano | G06K 7/1443 235/470 |
| 2012/0150589 | A1* | 6/2012 | Xian | G06K 7/10821 705/7.42 |
| 2012/0187194 | A1* | 7/2012 | Svetal | G06G 1/0063 235/470 |
| 2013/0062413 | A1* | 3/2013 | Nahill | G06K 7/10198 235/462.25 |
| 2013/0254044 | A1* | 9/2013 | Catoe | G07G 1/0072 705/16 |
| 2013/0320091 | A1* | 12/2013 | Detwiler | G07G 1/0045 235/462.11 |
| 2015/0193761 | A1* | 7/2015 | Svetal | G06Q 20/208 705/23 |
| 2016/0048715 | A1* | 2/2016 | McQueen | G06K 7/10871 235/462.2 |
| 2016/0189489 | A1* | 6/2016 | Au | G07G 1/0072 235/383 |
| 2016/0292468 | A1* | 10/2016 | Madej | G06Q 20/208 |
| 2016/0292475 | A1* | 10/2016 | Madej | G06F 16/907 |
| 2017/0061817 | A1* | 3/2017 | Mettler May | A61B 5/1124 |
| 2018/0096332 | A1* | 4/2018 | O'Herlihy | G08B 21/182 |
| 2018/0157881 | A1* | 6/2018 | Beghtol | G06K 7/10792 |
| 2018/0189763 | A1* | 7/2018 | Olmstead | G06V 10/42 |
| 2018/0308084 | A1* | 10/2018 | Naito | G07G 1/0063 |
| 2019/0180294 | A1* | 6/2019 | Crooks | G07G 1/0063 |
| 2020/0037981 | A1* | 2/2020 | Bechwati | G16H 30/40 |
| 2020/0234056 | A1* | 7/2020 | Pricochi | G06V 40/28 |
| 2020/0410312 | A1* | 12/2020 | Holub | G06V 10/32 |
| 2021/0097517 | A1* | 4/2021 | Handshaw | G06V 10/25 |
| 2021/0110123 | A1* | 4/2021 | Brock | G06K 7/1413 |
| 2021/0117949 | A1* | 4/2021 | Guo | G06T 7/70 |
| 2021/0216785 | A1* | 7/2021 | Debucean | G06F 18/2415 |
| 2021/0280027 | A1* | 9/2021 | Wen | G07G 1/0054 |
| 2021/0374375 | A1* | 12/2021 | Gururaja | G06K 7/1439 |
| 2021/0374699 | A1* | 12/2021 | Barkan | G06V 40/16 |
| 2021/0406918 | A1* | 12/2021 | Astvatsaturov | G06K 7/0004 |
| 2022/0061816 | A1* | 3/2022 | Lee | A61B 8/4494 |
| 2022/0067321 | A1* | 3/2022 | Costello | G06K 7/1404 |
| 2022/0233171 | A1* | 7/2022 | Johnson | A61B 8/5207 |
| 2023/0027855 | A1* | 1/2023 | Dheeraj Raju | G06N 20/00 |
| 2023/0043615 | A1* | 2/2023 | Saitoh | G07G 1/01 |
| 2023/0056327 | A1* | 2/2023 | Brakob | G06V 40/28 |
| 2023/0058903 | A1* | 2/2023 | Möller | G07G 1/0036 |
| 2023/0095037 | A1* | 3/2023 | Slaughter | G07G 1/0063 705/23 |
| 2023/0114364 | A1* | 4/2023 | Gurevich | G06K 7/10811 235/454 |
| 2023/0125326 | A1* | 4/2023 | Ushijima | G06Q 20/208 705/23 |
| 2023/0127469 | A1* | 4/2023 | Yamamoto | G06V 10/82 382/159 |
| 2023/0130674 | A1* | 4/2023 | Yamamoto | G06T 7/11 382/159 |

OTHER PUBLICATIONS

M. Ariyanto and P.D.Purnamasari, "Object Detection System for Self-Checkout Cashier System Based on Faster Region-Based Convolution Neural Network and YOLO9000," 2021 17th International Conference on Quality in Research (QIR): International Symposium on Electrical and Computer Engineering, Depok, India (Year: 2021).*

Eyahanyo, F., & Rath, T. (2019). Comparison of manual and automatic barcode detection in rough horticultural production systems. International Journal of Agricultural and Biological Engineering, 12(6), 169-176. doi:https://doi.org/10.25165/j.ijabe.20191206.4762 (Year: 2019).*

Golf AI App—Personal AI Golf Coach, © 2020 by DataHinge, retrieved Mar. 17, 2022, 6 pages, <https://www.golfaiapp.com/>.

William Constantine, "Using AI to Improve Sports Performance & Achieve Better Running Efficiency", Apr. 29, 2019, 13 pages <https://www.xyonix.com/blog/using-ai-to-improve-sports-performance-amp-achieve-better-running-efficiency>.

© 2022 Blast Motion, "Baseball Swing Analyzer—Video Analysis", retrieved Mar. 17, 2022, 1 page <https://plastmotion.com/products/baseball/>.

* cited by examiner

SCANNER SWIPE GUIDANCE SYSTEM

BACKGROUND

Conventionally, when a customer uses a self-service kiosk and an error occurs causes an item to not be successfully scanned, the customer attempts to re-scan an item. However, on many occasions, the item is continually not successfully scanned, as there is an issue that the customer is not solving when re-scanning the item. For example, a scanner may be dirty or obstructed in some way. When this occurs, the item cannot be successfully scanned. However, a customer may not know the scanner is dirty, leading the customer to continue to run the item over the scanner and never being successful in adding it to customer's transaction. As another example, a customer may not be scanning in a zone which the scanner can read. The customer may be scanning the item too high or too low, and the scanner is not capable of reading the bar code. The customer will continue to pass the item in the same path previously taken over the scanner, attempting to add the item to the transaction. However, if the same path is used, the item will never be added to the transaction. These situations lead to increased frustration and delay in the checkout process.

DETAILED DESCRIPTION

Embodiments of the present disclosure provide techniques for generating a 3D model of the region of effectiveness for scanning. As stated above, conventional techniques fail to provide feedback to assist customers who are not able to successfully scan items and add them to their transactions. The present disclosure provides for the generation of a 3D model, which depicts a region where the scanner can detect a bar code. This is an improvement in the functioning of a specific technology (e.g., checkout kiosks) in a manner which is not currently available.

Advantages of Developing a 3D Model for Scanning

A problem with current checkout kiosks is they cannot accurately detect the region of effectiveness for their bar code scanners. This makes it difficult to train new cashiers or provide feedback to customers at self-service kiosk (also referred to as self-checkout kiosks) when previous scan attempts are unsuccessful. Through the use of machine learning (ML) or statistical methods, a region of effectiveness for the installed scanner can be generated. The region of effectiveness may also be adjusted in response to changes in the environment (lighting), spills, and the like. A customer may be notified of a path which the customer should take when passing the item over the scanner, such that the path extends through the region of effectiveness. Additionally, an employee may be notified of an issue with the scanner, which is causing the unsuccessful scans. These embodiments allow, in one way or another, to get a successful scan of an item the customer hopes to purchase.

Figure 1:
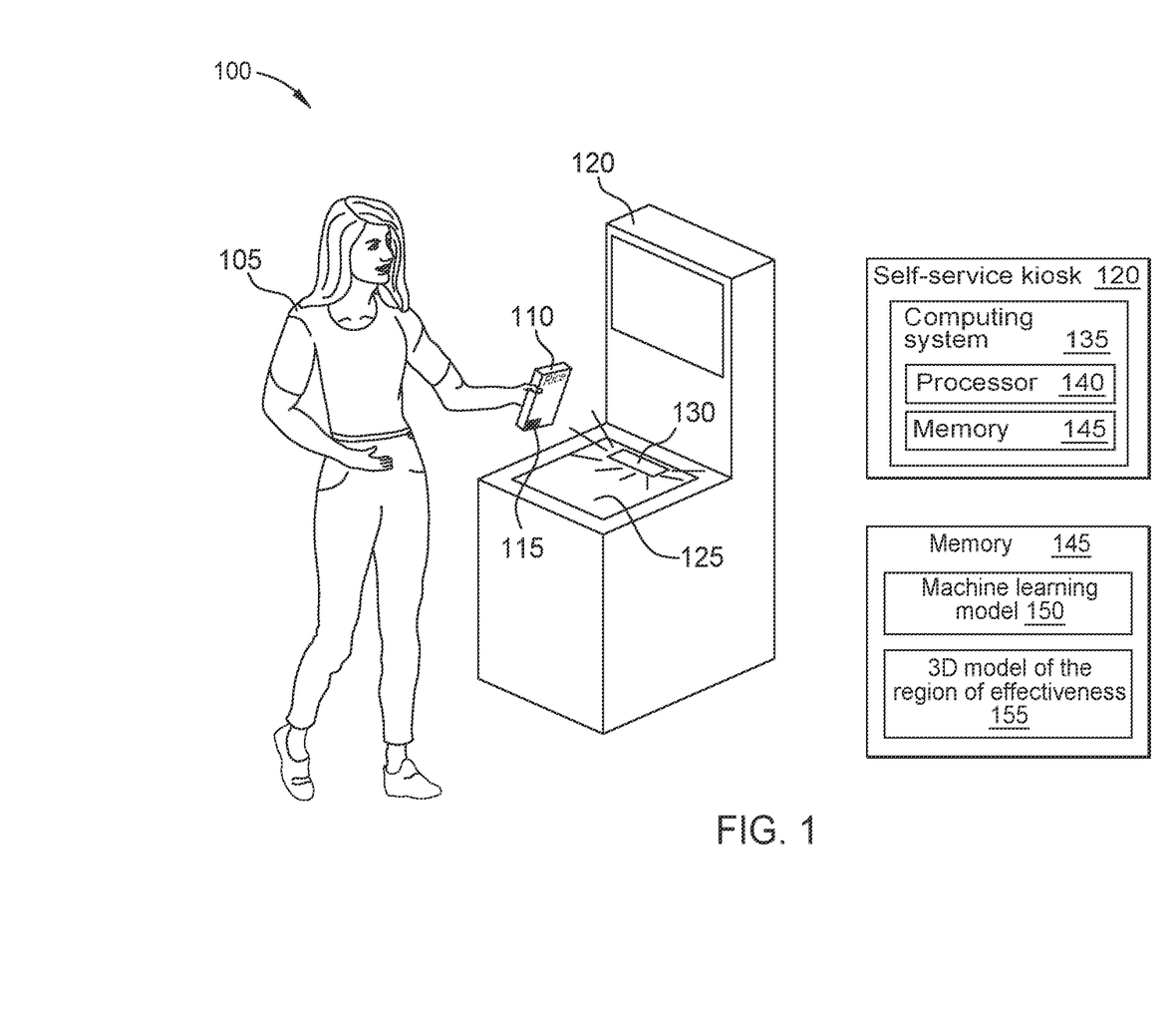
FIG. 1 depicts a first example environment, according to one embodiment.

With reference now to FIG. 1, a first example environment 100 is depicted. In one embodiment, this example environment may be a self-service lane at a grocery store. The self-service lane has of a self-service kiosk 120, illustrated as "Kiosk 1." The self-service kiosk 120 has a flatbed scanner 125. The flatbed scanner 125 has a scanning mechanism 130.

The self-service kiosk 120 has various components, including the computing system 135 which has a processor 140 and memory 145. The memory 145 contains the ML model 150 and the 3D model of the region of effectiveness 155. In one embodiment, the 3D model 155 depicts the region which, if an item is passed through it with a bar code facing the scanner 125, a scan will be successful. The 3D model 155 can be used to illustrate where a customer should pass an item in order to achieve a successful scan. The ML model 150 will be discussed in further detail with reference to FIG. 4.

In one embodiment, the customer 105 scans the item 110, which in this example is a box of rice. Item 110 has a bar code 115, which the self-service kiosk 120 uses to scan. The customer 105 passes the item 110 over the flatbed scanner 125 attempting to scan the item 110. In one embodiment, the scanning mechanism 130 scans the item 110. It is assumed the customer 105 attempts to scan the item 110 multiple times, but the scanning mechanism 130 is unable to successfully scan the item. As illustrated, the customer 105 becomes frustrated. For example, a scanner may be dirty or obstructed in some way. As another example, a customer may not be scanning in a zone which the scanner can read.

Although self-service kiosks are used as the primary example platform throughout this description, it should be understood that the disclosure is not limiting to a self-service kiosk. For example, a non-self-service platform can be used. In that case, a cashier may be trained with the 3D model 155 on how to properly scan items.

The processor 140, which can include any electronic circuitry such as, but not limited to one or a combination of microprocessors, microcontrollers, application specific integrated circuits (ASIC), application specific instruction set processor (ASIP), and/or state machines, that communicatively couples to memory 145 and controls the operation of the kiosk 120. The processor 140 may be 8-bit, 16-bit, 32-bit, 64-bit or of any other suitable architecture. The processor 140 may include an arithmetic logic unit (ALU) for performing arithmetic and logic operations, processor 140 registers that supply operands to the ALU and store the results of ALU operations, and a control unit that fetches instructions from memory and executes them by directing the coordinated operations of the ALU, registers and other components. The processor 140 may include other hardware that operates software to control and process information. The processor 140 executes software stored on the memory 145 to perform any of the functions described herein. The processor 140 controls the operation and administration of the kiosk 120 by processing information (e.g., information received from the scanner 125, scanning mechanism 130, and memory 145). The processor 140 is not limited to a single processing device and may encompass multiple processing devices.

The memory 145 may store, either permanently or temporarily, data, operational software, or other information for the processor. The memory 145 may include any one or a combination of volatile or non-volatile local or remote devices suitable for storing information. For example, the memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 145, a disk, a CD, or a flash drive. In particular embodiments, the software may include an application executable by the processor 140 to perform one or more of the functions described herein.

Figure 2:
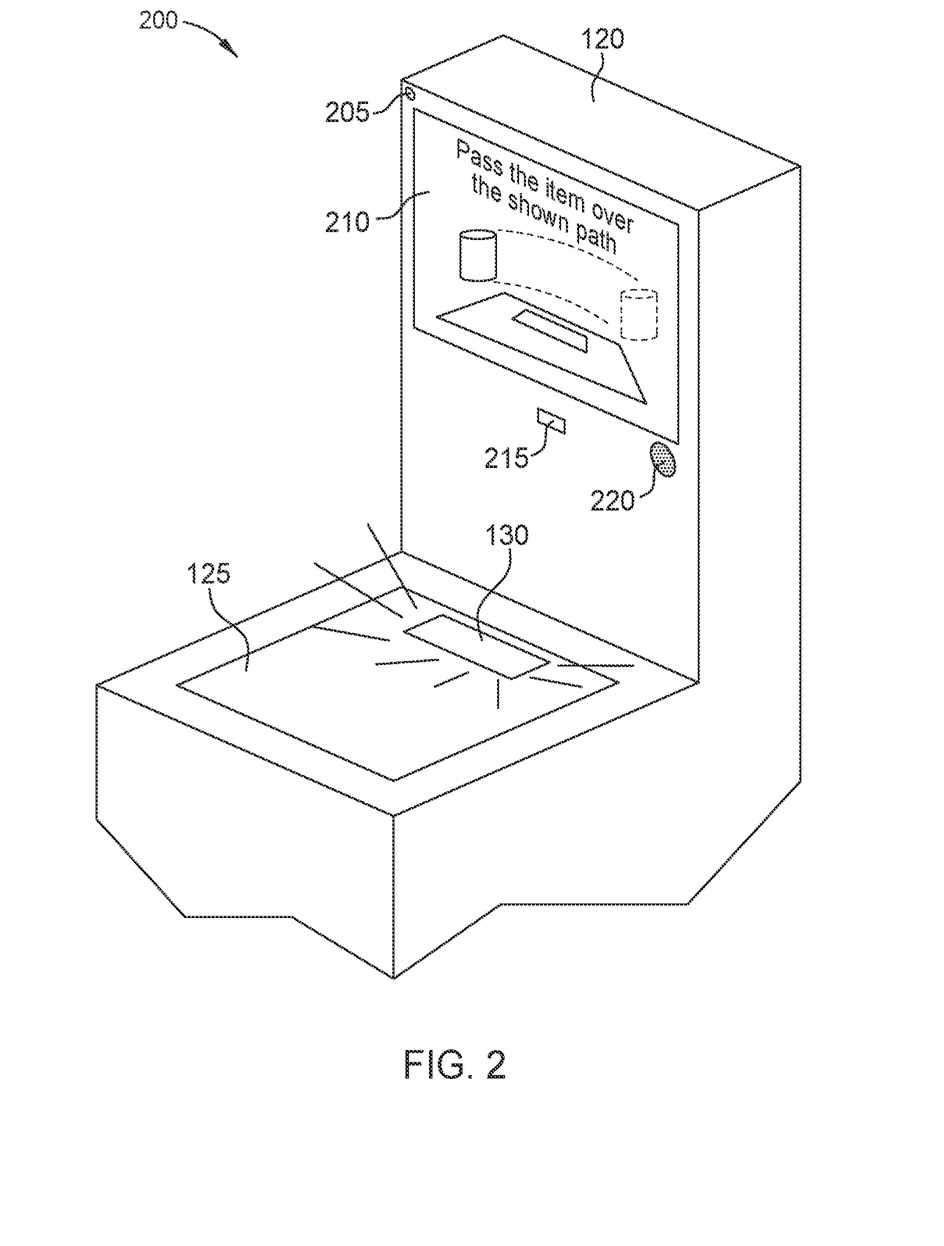
FIG. 2 depicts a second example environment, according to one embodiment.

FIG. 2 depicts a second example environment 200. In one embodiment, second example environment 200 is a second view of the first example environment 100. Self-checkout kiosk 120 has various components, in addition to those discussed above with reference to FIG. 1. Self-checkout kiosk 120 has a flatbed scanner 125. The flatbed scanner 125 has a scanning mechanism 130.

Further, the self-service kiosk has a screen 210. In one embodiment, the screen 210 displays a desired path of an item to be scanned. For example, the screen 210 may output a message, such as, "Pass the item over the shown path." As illustrated, the flatbed scanner and scanning mechanism are displayed. The screen 210 shows a 3D view of the path the item should be passed over to complete a successful scan. In one embodiment, the kiosk 120 ensures the path of the item passes through the region of the effectiveness described in FIG. 1. In addition, the screen 210 can display instructions regarding the orientation of the barcode such as "Please orient the item so a bar code is facing down." That way, the bar code is facing the scanner 120. Providing feedback to the customer in response to an unsuccessful scan will be discussed in further detail below with reference to FIG. 4.

The self-service kiosk also has a microphone 205, sensor 215, and speaker 220. In one embodiment, the speaker 220 emits a noise (e.g., beep) when a scan is successful, and the microphone 205 detects when a noise from speaker 220 is emitted. This allows for a successful scan to be determined. The microphone 205 detects the noise generated by the speaker 220, which is then used in training and implementation of the system to understand a scan was successful. In one embodiment, the sensor 215 is a plurality of sensors, which may be sonar or LiDAR. In one embodiment, the sensor 215 determines the depth and range of an item from the scanning mechanism 130. For example, the sensor 215 can determine the spatial proximity of the item to the scanning mechanism 130.

The sensor 215 determines where a customer's item to be scanned is located and if the item is within the region of effectiveness. The sensor 215 can ultimately detect if the customer is passing an item through a correct path that will lead to a successful scan. Using the sensor 215, the self-service kiosk can determine a failed scan took place. In this instance, the sensor 215 detects an item has passed over the scanning area. However, the microphone 205 did not detect a beep from the speaker 220. Because no successful scan noise was emitted and the sensor 215 detected an item passing nearby, a failed scan took place.

FIG. 2 illustrates providing feedback to a customer. In one embodiment, as stated above, a 3D view of the path the item should be passed over to complete a successful scan is displayed. In one embodiment, feedback is given to a customer after a predefined number of failed scans occurs. For example, feedback may be given after the sensor detects there have been 3 attempts at scanning, without a successful scan being achieved. In one embodiment, textual instructions may be provided to a customer to change the way she is passing an item. The customer may be passing an item over the scanner, but not within the region of effectiveness. For example, the customer may be passing the item too high. In this instance, the kiosk 120 provides feedback to the customer to lower the item. As another example, the customer may be passing the item too low. In this instance, feedback may be provided to the customer to raise the item. In one embodiment, the customer is passing the item with the bar code facing the wrong direction. This can be determined based on the fact the item is being passed in the region of effectiveness but without a successful scan being registered. In this instance, the customer is prompted to turn the product to face the bar code in the correct direction.

Figure 3:
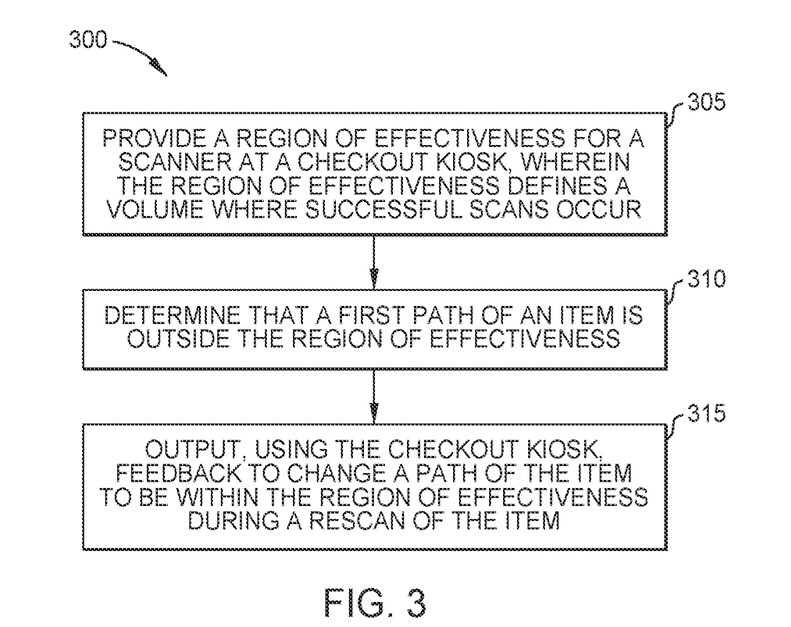
FIG. 3 is a flow diagram illustrating a method for generating a 3D model of a region of effectiveness for scanning.

FIG. 3 is a flow diagram illustrating a method 300 for generating a 3D model of a region of effectiveness for scanning.

At block 305, a region of effectiveness for a scanner at a checkout kiosk is provided, wherein the region of effectiveness defines a volume where successful scans occur. In one embodiment, the scanner is scanner 125 in FIG. 1, and the checkout kiosk is the self-service kiosk 120 in FIG. 1. The region of effectiveness may be the 3D model of the region of effectiveness 155 in FIG. 1 that is stored in the memory 145.

At block 310, it is determined that a first path of an item is outside the region of effectiveness. In one embodiment, the customer 105 in FIG. 1 is scanning the item, which may be item 110 in FIG. 1. The customer 105 is scanning the item 110 over the scanner 125. The path the customer takes is the first path of the item.

At block 315, using the checkout kiosk, feedback to change a path of the item to be within the region of effectiveness during a rescan of the item is inputted. one embodiment, feedback may be provided over a screen, which may be screen 210 in FIG. 2. Screen 210 may display various types of feedback to the customer. For example, the customer may be prompted to change the direction in which she is passing an item.

In some aspects, the techniques further comprise: determining that an indication of a successful scan is detected; and adjusting, using a machine learning (ML) model, the region of effectiveness by including the first path in the region of effectiveness.

In some aspects, the techniques further comprise: outputting the adjusted region of effectiveness.

In some aspects, the techniques further comprise: determining that a second path is within the region of effectiveness; determining that a pre-defined threshold number of unsuccessful scans on or near the first path has not been met; and prompting a customer to reorient the item during a second scan.

In some aspects, the techniques further comprise: providing the region of effectiveness for a scanner at the checkout kiosk during the second scan; determining that a third path of the item is outside the region of effectiveness; and outputting, using the checkout kiosk, feedback to change the path of the item to be within the region of effectiveness during a rescan of the item.

In some aspects, the techniques further comprise: determining that a second path is within the region of effectiveness; determining that a pre-defined threshold number of unsuccessful scans on or near the first path has been met;

adjusting, using a machine learning (ML) model, the region of effectiveness by removing the first path from the region of effectiveness; and prompting a customer to scan the item within the adjusted region of effectiveness.

In some aspects, the techniques further comprise: notifying an employee to take further action.

Figure 4:
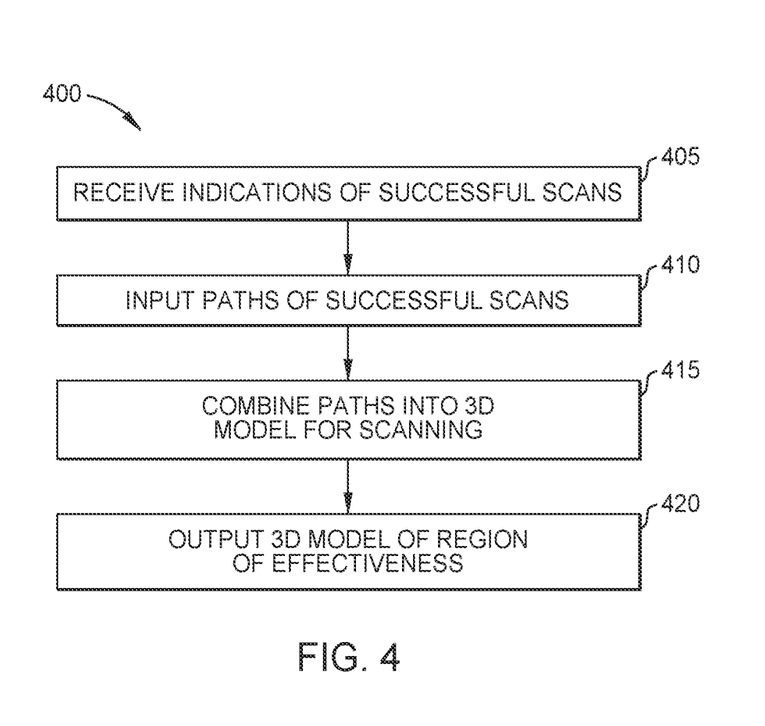
FIG. 4 is a flow diagram illustrating a method for generating a region of effectiveness for scanning.

FIG. 4 is a flow diagram illustrating a method 400 for generating a region of effectiveness for scanning. That is, the method 400 generates a 3D model of the region of effectiveness, indicating a 3D volume or region where a scanner can successfully read or detect a bar code.

At block 405, a software application receives indications of successful scans. This application can be executing in the kiosk, on a server, or in a cloud computing environment. In one embodiment, a microphone detecting a sound from a speaker (such as the sound the speaker emits after a successful scan) indicates a successful scan. The microphone can then inform the software application of the successful scan. Using the speaker to detect a successful scan allows for easy integration for this software application with existing self-service kiosks which typically already have a speaker for providing audio feedback to the user. The speaker emitting a noise (e.g., beep) prompts the software application to begin its functions to identify the region of effectiveness for the scanner at the kiosk. The microphone may be the microphone 205 from FIG. 2, and the speaker may be the speaker 220 from FIG. 2.

In other embodiments, the software application may be closely integrated with the scanning system in the kiosk such that the software application receives feedback directly from the scanning system to indicate when a successful scan has occurred without having to use a microphone to detect a successfully scan.

When multiple successful scans are detected, the software application receives these scans to determine what paths are successful for scanning an item. The sensor (which may be the sensor 215 from FIG. 2) detects the path an item takes over a scanner. In one embodiment, there is a minimum number of scans required to develop a valid 3D model, which may be represented as a statistical model. The 3D or statistical model is updated as paths for additional scans are identified.

At block 410, software application receives, as inputs, the paths of the successful scans indicated at block 405. The paths are those paths that customers used when a successful scan occurred. At block 415, the software application combines the inputted paths into a 3D model. In one embodiment, this is done by plotting the paths taken in free space. The most extreme of those paths form the border or boundaries of the 3D model. For example, the highest path that was taken corresponds to the highest point which a customer can pass an item. The paths may be planarized to form sides or boundaries of the 3D model. This plotting is done to determine a complete volume where, if the item is passed through (and assuming the bar code has is facing the scanner), a successful scan occurs.

The 3D model depicts the region of effectiveness. This 3D model may be developed by various algorithms using sensors, which in one embodiment may be sensor 215 in FIG. 2. The sensors are able to detect where, in reference to the scanning mechanism, the item is being passed. The sensors detect the paths of successful scan from which the 3D model is derived to depict where an item should be located to result in a successful scan. For example and as stated above, the 3D model may be a volume where a successful scan can be made using the paths that have been taken in the furthest directions to identify the boundaries of the volume.

At block 420, the determined region of effectiveness is outputted. In one embodiment, the region of effectiveness is the 3D model. As one example, employees may use the 3D model during their training to know the best path to take in scanning an item. The 3D model may be used in training of employees by displaying a 3D model of the view of the path where an item should be passed in order to achieve a successful scan. This 3D model of the view of the path may be used to provide feedback to a customer at a self-service kiosk.

Figure 5:
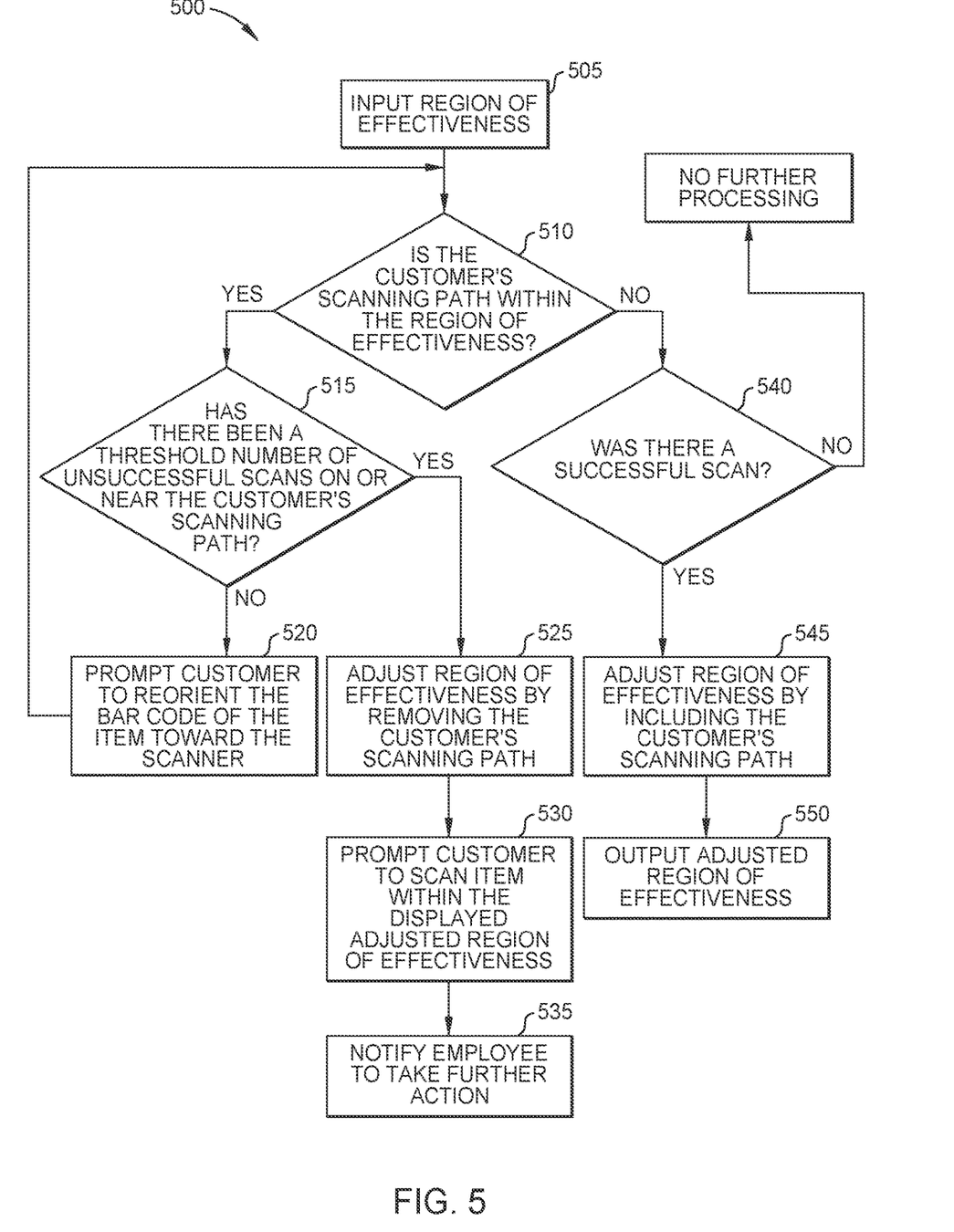
FIG. 5 is a flow diagram illustrating a method for adjusting the region of effectiveness.

FIG. 5 is a flow diagram illustrating a method 500 for adjusting the region of effectiveness. An adjustment may be needed in various circumstances. For example, a scanner may be partially covered (e.g., egg yolk is covering half of the scanner) and needs to be cleaned. In this instance, the region of effectiveness will need to be adjusted, as the previously measured region will not be applicable. For example, a customer may be passing an item through the region of effectiveness, but because part of the scanner is covered, typical successful scanning paths are not leading to successful scans.

At block 505, the self-service kiosk (e.g., the self-service kiosk 120 in FIG. 1) receives the region of effectiveness, which in one embodiment is determined with method 400, as input. At block 510, the self-service kiosk, using the sensor (e.g., the sensor 215 in FIG. 2), determines whether the path the customer took to pass the item over the scanner was within the region of effectiveness. If the path determined was within the region of effectiveness, the method proceeds to block 515. If the path determined was not within the region of effectiveness, the method proceeds to block 540.

At block 515, the self-service kiosk determines if there has been a threshold number of unsuccessful scans on or near the customer's scanning path. This threshold is used to determine whether the unsuccessful scan is the result of customer error (e.g., scanning with the bar code not facing the scanner) or other issues (e.g., the scanner is dirty). In one embodiment, the threshold is a predefined amount set by a system administrator. If the threshold is met, the method proceeds to block 525. For example, the set threshold may be five scans. If the customer scans an item near a path that has at four occasions before led to an unsuccessful scan, the method proceeds to block 525. However, if the threshold is not met, the method proceeds to block 520.

At block 520, the self-service kiosk prompts the customer to reorient the bar code on the item toward the scanner. For example, the customer may scan an item with the bar code facing up. However, the bar code should be facing down for it to be detected by the scanner. In this instance, the customer will be prompted to reorient the item in a manner to achieve a successful scan. After the customer is prompted, the customer will re-scan the item. The method then proceeds back to 510 to determine if the customer's scanning path is within the region of effectiveness.

If at block 515, the self-service kiosk determines a threshold number of unsuccessful scans has taken place, the method proceeds to block 525. At block 525, the ML model adjusts the region of effectiveness. Because the customer's scanning path was in the determined region of effectiveness, but there has been a threshold number of unsuccessful scans on or near that path, that path should not be included in the region of effectiveness as it is not effective. For example, there may have been something spilled on the scanner, or the customer may have placed an object that occludes part of the scanner from being able to view the entire region. In one embodiment, the scanner may need maintenance. The ML model will adjust the region of effectiveness by removing the customer's scanning path. After block 525, the method proceeds to block 530.

At block 530, the self-service kiosk uses the adjusted region of effectiveness to output a 3D view of a path the item should be passed over to complete a successful scan. That is, the self-service kiosk can provide instructions to the customer to move the item in a path that is in the adjusted region of effectiveness. This display prompts the customer to adjust the path of scanning. At block 535, the self-service kiosk notifies the employee to take further action. For example, the region of effectiveness may have been adjusted and narrowed because the scanner is dirty, or the scanner may need maintenance. The employee is notified to clean the scanner or to perform a maintenance action.

If, at block 510, the self-service kiosk determines the customer's scanning path was not within the region of effectiveness, the method proceeds to block 540. At block 540, the self-service kiosk determines whether an indication of a successful scan was detected. In one embodiment, this means the speaker 220 of FIG. 2 emitted a noise that the microphone 205 of FIG. 2 could detect. For example, the speaker emitted a beeping noise, and the microphone detected this beep. However, the scanning path was outside the region of effectiveness.

If there was a successful scan, the method then proceeds to block 545, where the ML model adjusts the region of effectiveness to include the customer's scanning path. In one embodiment, the customer took a path that was not used during development of the 3D model. However, because the path taken resulted in a successful scan, it should be included in the region of effectiveness. For example, the customer may pass the item over the scanner, and the speaker emits a sound to indicate a scan was successful. This may occur due to a change in the environment. As an example, the lighting, when the ML model was trained, was different than the lighting when the customer passed the item over the scanner. At block 550, the self-service kiosk outputs the adjusted region of effectiveness. In this case, the ML model may increase the size or volume of the region of effectiveness, unlike at block 525 where the ML model decreased the size of the region of effectiveness. In one embodiment, the self-service kiosk can use the adjusted region of effectiveness to provide future feedback to the customer such as displaying a path an item should follow to complete a successful scan.

Figure 6:
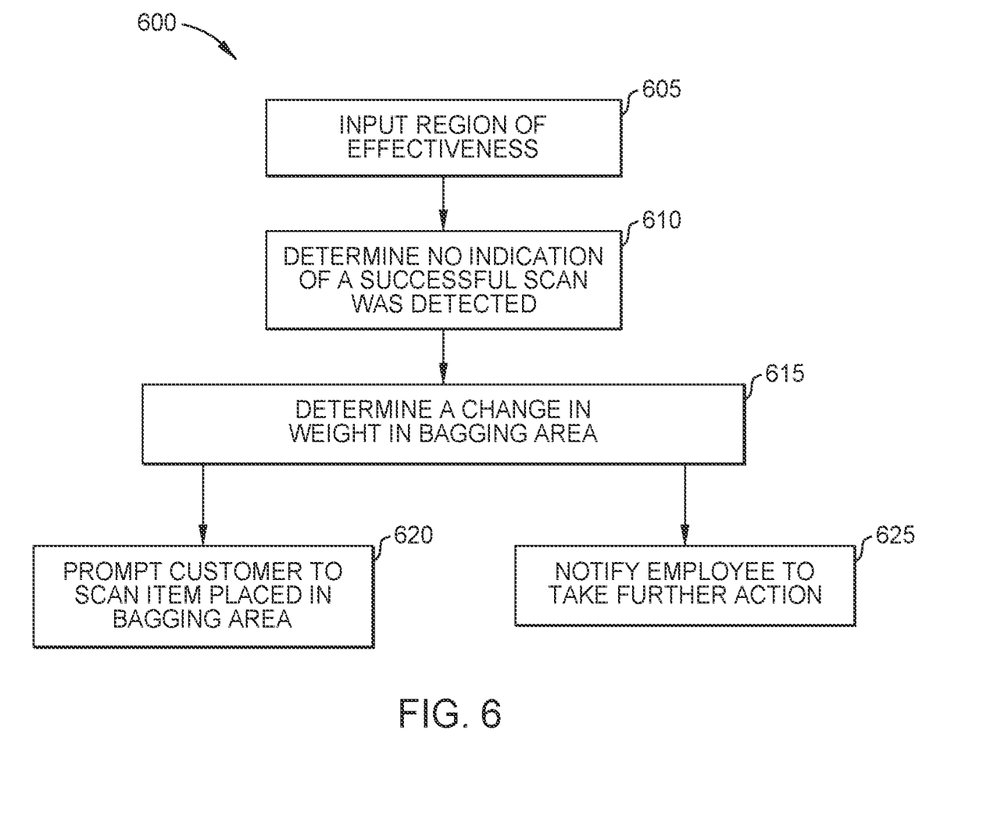
FIG. 6 is a flow diagram illustrating a method for remedying a change in weight in a bagging area.

FIG. 6 is a flow diagram illustrating a method 600 for remedying a change in weight in a bagging area.

At block 605, the system receives, as input, the region of effectiveness, which in one embodiment is determined with method 400. At block 610, the system determines no indication of a successful scan was detected. In one embodiment, this means the speaker 220 of FIG. 2 did not emit a noise that the microphone 205 of FIG. 2 could detect. At block 615, the system detects a change in weight in the bagging area. In one embodiment, this is done by weight sensors located in the area for customers to bag their items. At block 620, the system prompts the customer to scan the item that was placed in the bagging area, which prompted the change in weight to be detected. In one embodiment, the customer is prompted with a display of the 3D view of the path the item should be passed over to complete a successful scan. At block 625, the system notifies an employee to take further action. In one embodiment, both of blocks 620 and 625 are completed.

For example, a customer may be a nefarious actor attempting to steal an item. Although the customer did not pass the item in the region of effectiveness, the customer places the item in the bagging area. Because the bagging area contains weight sensors, the self-service kiosk, which in one embodiment may be 120 in FIGS. 1 and 2, determines a new item has been placed in the bagging area. The self-service kiosk may then prompt the customer to scan the item that was placed in the bagging area. In one embodiment, the screen is 210 in FIG. 2. For example, the screen may display a message, such as, "Please scan the item most recently placed in the bagging area."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s), In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
providing a region of effectiveness for a scanner at a checkout kiosk, wherein the region of effectiveness comprises a volume;
determining that a first path of an item is outside the region of effectiveness;
outputting, using the checkout kiosk, feedback to change a path of the item to be within the region of effectiveness during a rescan of the item;
determining that an indication of a successful scan is detected; and
adjusting, using a machine learning (ML) model, the region of effectiveness by including the first path in the region of effectiveness.

2. The method of claim 1, further comprising:
outputting the adjusted region of effectiveness.

3. The method of claim 1, further comprising:
determining that a second path is within the region of effectiveness;
determining that a pre-defined threshold number of unsuccessful scans on or near the first path has not been met; and
prompting a customer to reorient the item during a second scan.

4. The method of claim 3, further comprising:
providing the region of effectiveness for the scanner at the checkout kiosk during the second scan;
determining that a third path of the item is outside the region of effectiveness; and
outputting, using the checkout kiosk, feedback to change the path of the item to be within the region of effectiveness during a rescan of the item.

5. The method of claim 1, further comprising:
determining that a second path is within the region of effectiveness;
determining that a pre-defined threshold number of unsuccessful scans on or near the first path has been met;
adjusting, using the ML model, the region of effectiveness by removing the first path from the region of effectiveness; and
prompting a customer to scan the item within the adjusted region of effectiveness.

6. The method of claim 5, further comprising:
notifying an employee to take further action.

7. A system, comprising:
one or more computer processors; and
a memory containing a program which when executed by the one or more computer processors performs an operation, the operation comprising:
providing a region of effectiveness for a scanner at a checkout kiosk, wherein the region of effectiveness comprises a volume;
determining that a first path of an item is outside the region of effectiveness;
outputting, using the checkout kiosk, feedback to change a path of the item to be within the region of effectiveness during a rescan of the item;
determining that a second path is within the region of effectiveness;
determining that a pre-defined threshold number of unsuccessful scans on or near the first path has been met;
adjusting, using a machine learning (ML) model, the region of effectiveness by removing the first path from the region of effectiveness; and
prompting a customer to scan the item within the adjusted region of effectiveness.

8. The system of claim 7, wherein the operation further comprises:
determining that an indication of a successful scan is detected; and
adjusting, using a machine learning (ML) model, the region of effectiveness by including the first path in the region of effectiveness.

9. The system of claim 8, wherein the operation further comprises:
outputting the adjusted region of effectiveness.

10. The system of claim 7, wherein the operation further comprises:
determining that a second path is within the region of effectiveness;
determining that a pre-defined threshold number of unsuccessful scans on or near the first path has not been met; and
prompting a customer to reorient the item during a second scan.

11. The system of claim 10, wherein the operation further comprises:
providing the region of effectiveness for the scanner at the checkout kiosk during the second scan;
determining that a third path of the item is outside the region of effectiveness; and
outputting, using the checkout kiosk, feedback to change the path of the item to be within the region of effectiveness during a rescan of the item.

12. The system of claim 11, wherein the operation further comprises:
notifying an employee to take further action.

13. A computer program product for generating a region of effectiveness, the computer program product comprising:
a computer-readable storage medium having computer-readable program code embodied therewith, the computer-readable program code executable by one or more computer processors to:
provide a region of effectiveness for a scanner at a checkout kiosk, wherein the region of effectiveness comprises a volume;
determine that a first path of an item is outside the region of effectiveness;
output, using the checkout kiosk, feedback to change a path of the item to be within the region of effectiveness during a rescan of the item;
determine that an indication of a successful scan is detected; and
adjust, using a machine learning (ML) model, the region of effectiveness by including the first path in the region of effectiveness.

14. The computer program product of claim 13, wherein the computer-readable program code is further executable to:
output the adjusted region of effectiveness.

15. The computer program product of claim 13, wherein the computer-readable program code is further executable to:
determine that a second path is within the region of effectiveness;
determine that a pre-defined threshold number of unsuccessful scans on or near the first path has not been met; and
prompt a customer to reorient the item during a second scan.

16. The computer program product of claim 15, wherein the computer-readable program code is further executable to:
provide the region of effectiveness for the scanner at the checkout kiosk during the second scan;
determine that a third path of the item is outside the region of effectiveness; and
output, using the checkout kiosk, feedback to change the path of the item to be within the region of effectiveness during a rescan of the item.

17. The computer program product of claim 13, wherein the computer-readable program code is further executable to:
determine that a second path is within the region of effectiveness;
determine that a pre-defined threshold number of unsuccessful scans on or near the first path has been met;
adjust, using the ML model, the region of effectiveness by removing the first path from the region of effectiveness;
prompt a customer to scan the item within the adjusted region of effectiveness; and
notify an employee to take further action.

* * * * *